(12) United States Patent
Schumacher et al.

(10) Patent No.: US 8,875,659 B2
(45) Date of Patent: Nov. 4, 2014

(54) LINEAR WATER CIRCULATING ANIMAL DRINKER

(75) Inventors: Egon Schumacher, Barnstorf (DE); Wolfgang Meyer, Barnstorf (DE)

(73) Assignee: Lubing Maschinenfabrik Ludwig Bening GmbH & Co. KG, Barnstorf (DE)

(*) Notice: Subject to any disclaimer, the term of this patent is extended or adjusted under 35 U.S.C. 154(b) by 1303 days.

(21) Appl. No.: 12/613,553

(22) Filed: Nov. 6, 2009

(65) Prior Publication Data

US 2010/0116214 A1   May 13, 2010

(30) Foreign Application Priority Data

Nov. 11, 2008  (DE) .................... 10 2008 056 832
Dec. 12, 2008  (DE) .................... 10 2008 061 994

(51) Int. Cl.
*A01K 7/00* (2006.01)
*A01K 39/02* (2006.01)
*A01K 7/06* (2006.01)

(52) U.S. Cl.
CPC .. *A01K 7/06* (2013.01); *A01K 39/02* (2013.01)
USPC .............................................. 119/73; 119/72

(58) Field of Classification Search
USPC .................... 119/57.3, 57.4, 72.5, 72, 73
See application file for complete search history.

(56) References Cited

U.S. PATENT DOCUMENTS

| | | | |
|---|---|---|---|
| 2,706,966 A | | 4/1955 | Cline |
| 3,233,864 A | * | 2/1966 | Behlen et al. .................. 251/243 |
| 3,285,226 A | * | 11/1966 | Schuler ......................... 119/457 |
| 3,537,430 A | | 11/1970 | Peppler |
| 4,269,147 A | | 5/1981 | Vorbeck |
| 5,138,980 A | * | 8/1992 | Ewing ............................ 119/73 |
| 5,282,440 A | * | 2/1994 | Hostetler ........................ 119/72 |
| 5,284,110 A | * | 2/1994 | Hostetler ........................ 119/72 |
| 6,910,444 B1 | * | 6/2005 | Soppe ............................. 119/73 |
| 2008/0017120 A1 | | 1/2008 | Hawk |

OTHER PUBLICATIONS

European Patent Office, European Search Report (on related application), Mar. 17, 2014.

* cited by examiner

*Primary Examiner* — Kimberly Berona
(74) *Attorney, Agent, or Firm* — Laurence P. Cotton; Smith Risley Tempel Santos LLC

(57) ABSTRACT

An animal drinker allowing for the circulation of the water in the animal drinker. To this end, the animal drinker has two parallel pipe strings (23, 24) that form a water circuit ensuring a constant movement of water, namely that water flows continuously through the pipe strings (23, 24) even when no water has been removed at the drinking valves (20) over an extended period of time.

12 Claims, 9 Drawing Sheets

LINEAR WATER CIRCULATING ANIMAL DRINKER

STATEMENT OF RELATED APPLICATIONS

This patent application claims the benefit of German Patent Application No. DE 10 2008 056 832.5 having a filing date of 11 Nov. 2008 and German Patent Application No. DE 10 2008 061 994.9 having a filing date of 12 Dec. 2008.

BACKGROUND OF THE INVENTION

1. Technical Field

The invention relates to an animal drinker, preferably a line drinker, having at least one water supply line and a plurality of drinking valves which are assigned to the water supply line.

2. Prior Art

Drinkers of the type addressed here are employed to provide animals, in particular domestic animals, with the water they require. Such drinkers are usually configured so that the animals themselves can access the water to cover their needs.

So-called line drinkers are employed primarily in large-scale small animal husbandry, in particular for poultry. Hitherto well-known line drinkers are equipped with a plurality of drinking valves assigned to a elongate pipe string, thus making it possible to provide the drinking valves with water. The drinking valves can be actuated by the animals themselves.

If none or only a few of the drinking valves are actuated by the animals, the water in the pipe string stands still. Particularly at night, when the animals consume no water over an extended period of time, this can result in an disproportional increase in the germs normally present in the water. In addition, the water remaining in the pipe string for longer periods of time heats up significantly, especially in warmer geographical regions. These relatively high temperatures result in a rapid increase of germ growth in the water. In addition, however, the water remaining idle in the pipe string for an extended period of time can also cause solid particles to settle out in the water and end up in the drinking valves, which are sensitive to impurities, thus rendering them inoperable. Finally, an extended period of standing water containing chemical additives promotes the unmixing of the solution.

BRIEF SUMMARY OF THE INVENTION

Proceeding from the above, the object of the invention is to provide an animal drinker that ensures a reliable and unproblematic supply of water to the animals and in particular which meets the necessary hygienic requirements.

An animal drinker that achieves this object has at least one water supply line and a plurality of drinking valves which are assigned to the water supply line, characterized in that the water supply line is configured as a water circulation line. Accordingly, the water supply element is configured as a water circulation line. This results in a water circuit. The water is circulated permanently or at least periodically, meaning that it is always in motion, even when no drinking valve has been used for an extended period of time. The water, which can be pure mains water, but also water provided with such additives as medicaments, nutrients, or the like, flows continually past the drinking valves. As a result, the water, particularly when it contains any additives, cannot unmix. Any solid particulates contained in the water cannot settle out during periods when the water stands still.

In a preferred embodiment of the invention, the water circulation line is composed of a plurality of pipe strings. Preferably the water circulation line has two pipe strings which are connected at their ends to conduct water. The preferably elongate, straight pipe strings, by virtue of being connected at their ends, makes a water circuit possible.

Furthermore, the invention provides that all drinking valves are assigned to one of the pipe strings, preferably a bottom pipe string of the pipe strings arranged one above the other. This lower pipe string can be accessed by the animals from below or from the side, as is common with line drinkers, in that the drinking valves project partially from the underside of the pipe string. When the water has flowed through the lower pipe string in the one direction past the drinking valves, it is fed back through the upper pipe string to the beginning of the lower pipe string. But it is also conceivable to assign drinking valves to both pipe strings. The two pipe strings employed to form the water circulation line are then expediently spaced apart at a sufficient distance to one another. Thus, a greater number of drinking valves can be accommodated in a specific surface area than is the case in known line drinkers.

A further animal drinker intended as a solution to the aforementioned object, which can also be a preferred further development of the previously described animal drinker, has at least one water supply line and a plurality of drinking valves which are assigned to the water supply line, characterized in that the water supply line is assigned at least one treatment device for the water. Accordingly, the water supply system is assigned at least one treatment device for the feed of water used in the drinking valves. This makes a processing of the water possible. This is particularly applicable when the continuously circulating water repeatedly flows past the drinking valves, making it possible for it to be subjected to repeated processing.

The processing apparatus may involve one which eliminates such contaminants as bacteria, germs, fungi and the like from the water. This prevents a microbial contamination of the drinking water to be fed to the animals, or at least reduces it to a level that stays below the maximum permissible values. The water is disinfected and/or sterilized. The preferred water treatment method is UV irradiation. The treatment device expediently comprises at least one ultraviolet lamp (UV lamp), by means of which the water to be treated for the animals is subjected to ultraviolet irradiation. In particular, this treatment allows one to carry out a sterilization of the water for the animals (drinker water).

As an alternative or supplementary feature, a treatment device is also conceivable which is configured as a water temperature control system. This makes it possible to cool or heat the water as required. In warm geographical regions the water is preferably cooled, thus reducing the reproductive rate of microbial organisms in the water, in particular germs. In cooler geographical regions it may be necessary to heat the water to avoid dispensing water that is too cold for the animals, which can result in sickness, particularly among younger animals.

Furthermore, it is conceivable that the drinkers for animals be provided with a metering device, for example a medicament dispenser. This makes it possible to provide the drinker water with the appropriate dosages of medicaments or also with other supplements, such as nutrients. Particularly when the water circulates in the pipe strings, the metering device allows one to add an accurately dosed supplement of medicaments and other additives.

A preferred further refinement of all drinkers for animals proposed for solving the object stated at the outset provides for assigning a pump to the water circulation line or the pipe strings for the purpose of circulating the water supplied to the animals in the water circulation line or in the pipe strings. The at least one pipe thus serves as a circulating pump which maintains the flow of drinking water in the pipe strings even when no water is being dispensed to the animals at the drinking valves.

In a preferred embodiment of the invention the at least one pump is employed to provide the drinking valves with water, namely drinker water or drinking water, from a reservoir. The reservoir represents a water buffer which ensures that the at least one pump is continually supplied with sufficient water so that it can maintain the constant circulation of water in the pipe strings.

Provision is also made for assigning the pump and/or reservoir to adjacent ends of the two pipe strings. The at least one pump and preferably the reservoir as well thus result in a connection of the ends of both pipe strings arranged one above the other and located at the same end of the animal drinker. Thus, the water flowing back from one pipe string can be held in the reservoir and pumped from the latter by the pump back into the other pipe string. The adjacent ends of the pipe strings at the other end of the animal drinker then only need to be connected to each other by an overflow channel from which the water from one pipe string is conducted into the other pipe string. The two pipe strings, the overflow channel and the reservoir with the pump thus constitute a circuit of the water circulation line.

In a preferred embodiment of the invention, the reservoir is assigned at least one inlet for water, preferably fresh water from a water supply, such as a well. Water is fed back to the reservoir via the inlet, thus keeping the reservoir filled on a continual basis.

The inlet is preferably assigned a valve which constantly feeds the reservoir with as much water as necessary in that the valve can open up the inflow of water to the reservoir as required. If no water is being taken from the drinkers by the animals, the inflow of fresh water to the reservoir can be stopped by the valve. It is preferably provided that the valve can be actuated as a function of the water level in the reservoir.

All animal drinkers employed as the solution of the object of the invention can be equipped in particular with a pressure regulator, which is disposed upstream of the inlet to the reservoir and limits and reduces the pressure with which the reservoir can be fed with fresh water from the water supply in such a manner that keeps the water from spraying out of the drinking valves when they are opened by the animals. In addition, the pressure regulator is preferably employed to maintain an essentially constant level of water in the reservoir.

A further animal drinker for solving the object stated at the outset, which can also involve preferred refinements in the previously described animal drinkers, has at least one pipe string and a plurality of drinking valves assigned to at least one pipe string, characterized in that the pipe string has an upright web. In the case of this animal drinker, the pipe string is provided with an upright web. This upright web not only reinforces the pipe string but can also be employed for suspending the line drinker in the stall. The web also prevents the animals, especially poultry, from perching on the pipe strings and disturbing other animals as they drink.

The web is preferably connected to the pipe string as a single piece, preferably being integrally molded to the latter. This one-piece configuration of the web and pipe string makes it easy to keep the animal drinker clean. Above all, this configuration avoids the formation of any seams or interfaces in which dirt might lodge.

In the case of animal drinkers having two parallel pipe strings, the pipe strings are configured to be joined together. Preferably the two somewhat spaced-apart pipe strings are connected to one another by a web, with the web and the pipe strings arranged on its opposing longitudinal edges being configured as a single piece. The pipe strings are thus linked together seamlessly so that even hygienic problems arising from stuck grime are avoided.

For all animal drinkers proposed above as the solution to the object stated at the outset, provision is made for forming the pipe strings from a plurality of pipe string sections which can be detachably connected to one another. The pipe string sections have both parallel sections of the pipe string and the web sections. By connecting the appropriate number of identical pipe string sections it is possible to achieve the desired length of parallel pipe strings.

In order to join the pipe string sections as needed, provision is also made for their watertight connection at their adjacent ends. Cheeks or half shells can be employed to connect the pipe string sections in a manner that prevents any relative movement between the sections. The pipe string sections are connected by simply bolting the half shells or cheeks together. This connection is easily detachable. Seals assigned to the half shells or cheeks can be employed to make a watertight connection between the adjacent ends of the pipe string sections. The seals are preloaded when the half shells or cheeks are bolted together.

BRIEF DESCRIPTION OF THE DRAWINGS

A preferred exemplary embodiment of the invention is shown in the following on the basis of the drawing, which shows.

DETAILED DESCRIPTION OF PREFERRED EMBODIMENTS

Figure 1:
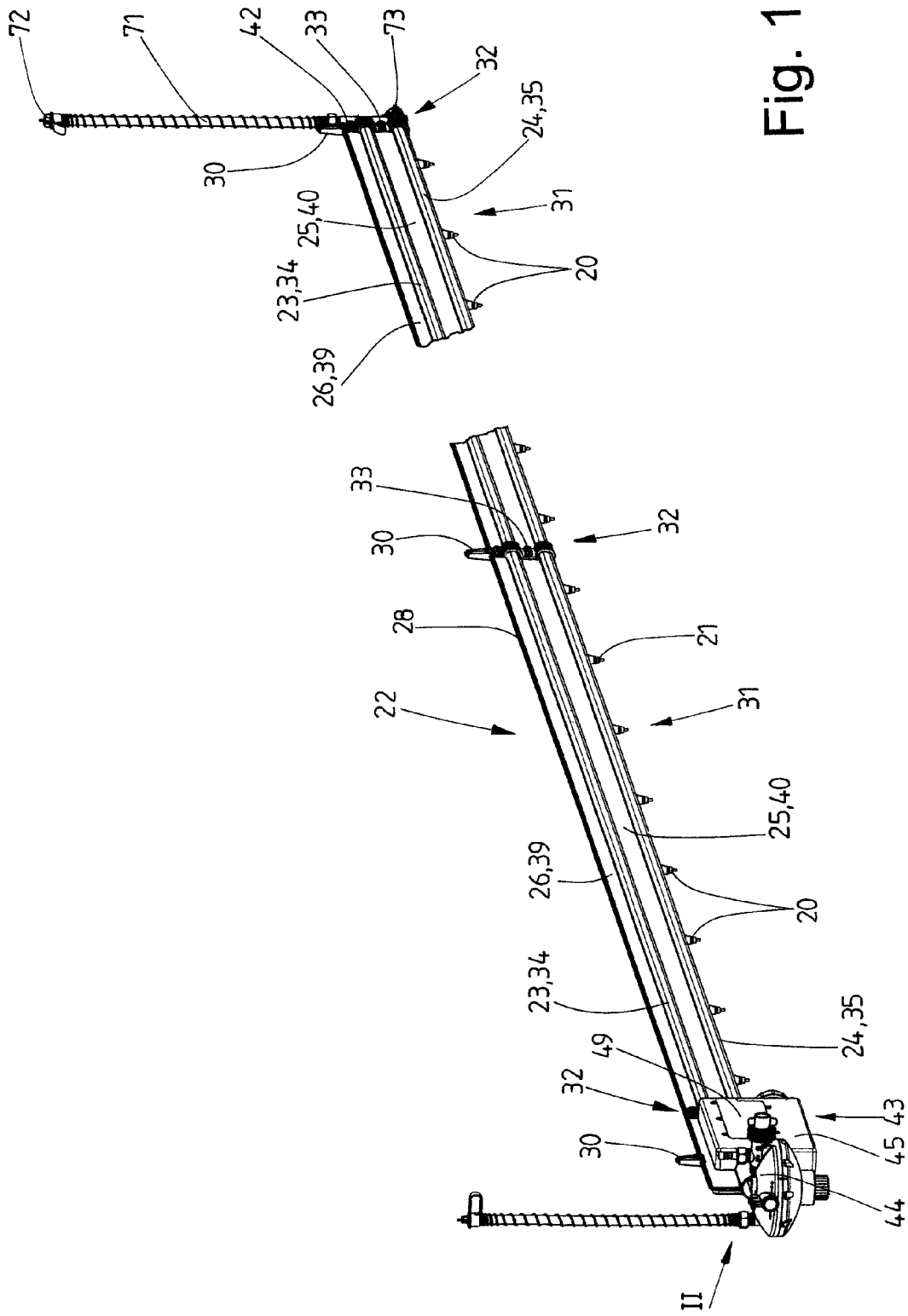
FIG. 1 is a perspective full view of an animal drinker.
Figure 2:
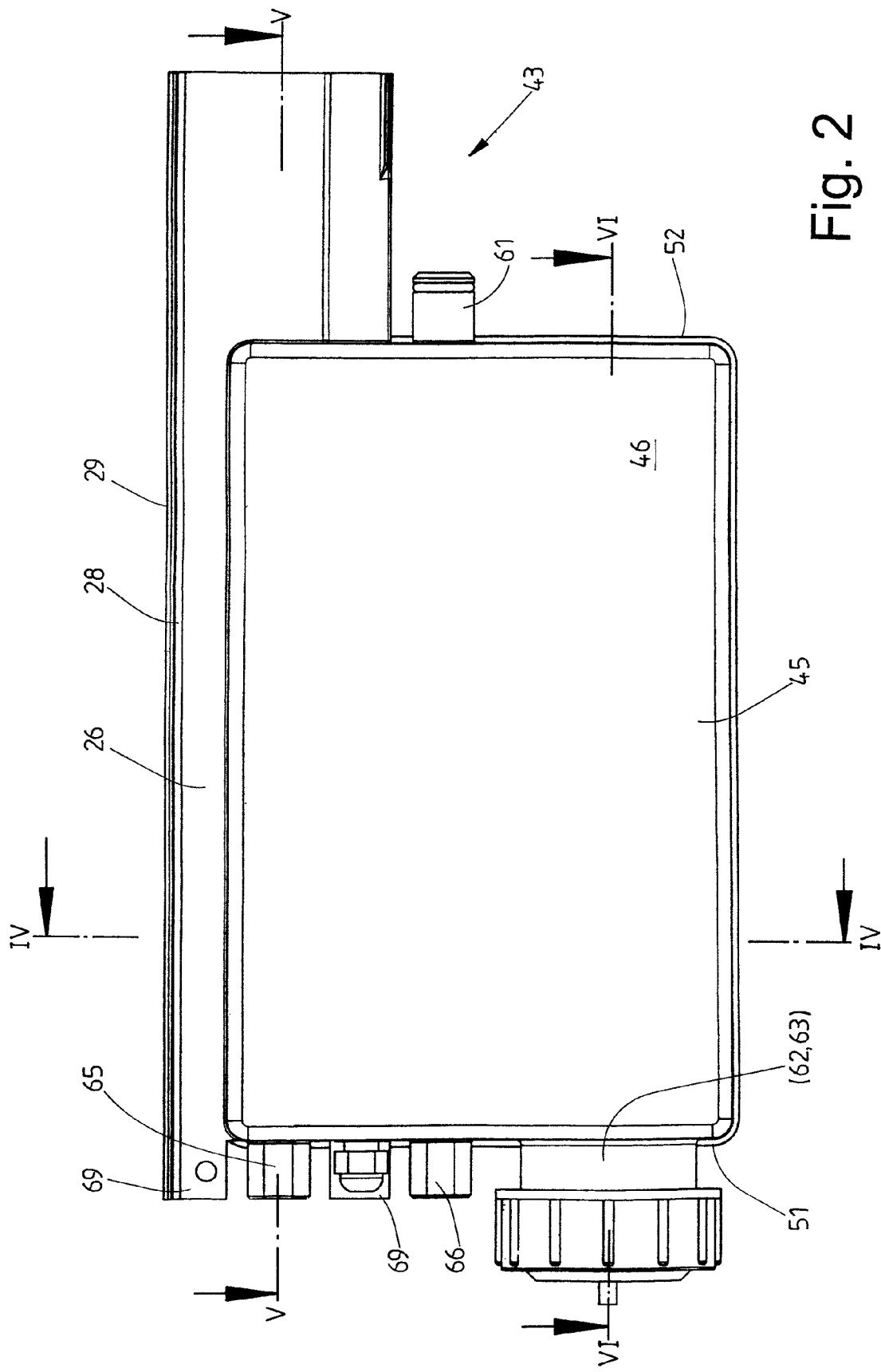
FIG. 2 is a side view of a technical unit of the animal drinker in a view II pursuant to FIG. 1.

An animal drinker configured as a line drinker is shown completely in FIG. 1 and only in part in the other Figures. The line drinker enables animals, in particular small animals, to access the drinker themselves to cover their water needs. Such a line drinker is usually used by large-scale poultry farms. The line drinkers are suspended in the coop on wires not shown in the Figures, specifically at a distance from the floor of the coop corresponding to the size of the animals in order that they can comfortably reach the drinking valves 20 of the line drinker. The drinking valves 20, which are well-known in themselves, have a valve pin whose exposed lower end can be lifted and/or tilted by the animals with their beaks, thus opening the drinking valve 20 to supply water to the animals. After the valve pin 21 is released the drinking valve 20 automatically closes.

The line drinker has a elongate, rectilinear water circulation line 22. The water circulation line 22 is suspended in the coop to run horizontally. The water circulation line 22 is configured according to the invention such that it allows for a closed water circuit in the line drinker. To this end, the water circulation line 22 has two parallel pipe strings 23, 24, which extend in a straight line in the longitudinal direction of the water circulation line 22, specifically in a horizontal orientation. Both pipe strings 23 and 24 are provided with an identical cross section which in the shown exemplary embodiment has a square configuration with rounded edges. However, it is possible for the pipe strings 23 and 24 to be configured with different cross sections. In the shown animal drinker, the pipe strings 23, 24 are positioned at a distance to one another. In this case only the lower pipe string 24 is assigned all of the drinking valves 20. The drinking valves 20 are spaced uniformly along the entire length of the pipe string 24. The drinking valves 20 are screwed into the bottom side of the pipe string 24 such that an exposed lower end of the valve pin 21 projects downwards beyond the lower wall of the pipe string 24 in order that the valve pins 21 of the drinking valves 20 are freely accessible to the animals. If the pipe strings 23 and 24 are situated next to one another, drinking valves 20 can be assigned to both pipe strings 23 and 24.

Figure 7:
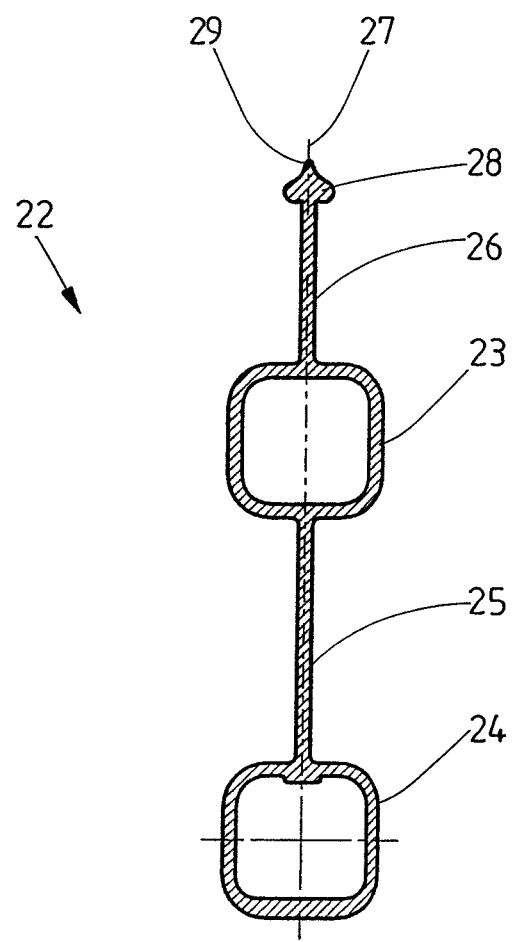
FIG. 7 is a cross section through a water line of the animal drinker.

The pipe strings 23 and 24, disposed one above the another and at a distance to one another, are connected by an narrow upright web 25 running in the longitudinal direction of the parallel pipe strings 23 and 24 (FIG. 7). Another upright web 26 is disposed above the top pipe string 23. This web 26 also runs in the longitudinal direction of the pipe string 23. The central plane of both webs 25 and 26 coincides with a common vertical central plane 27 of the water circulation line 22. Also coinciding with this central plane 27 are the center points of the pipe strings 23 and 24 (FIG. 7). An exposed top longitudinal edge of the top web 26 is assigned a triangular-shaped edge profile 28 having a peaked edge 29 running in the longitudinal direction of the water circulation line 22. This peaked edge 29 of the edge profile 28 keeps fowl from perching on the top of the water circulation line 22 of the line drinker. The edge profile 28 is also used to attach hangers 30 to the lower ends of wires (not shown) for suspending the line drinker in the coop.

Figure 5:
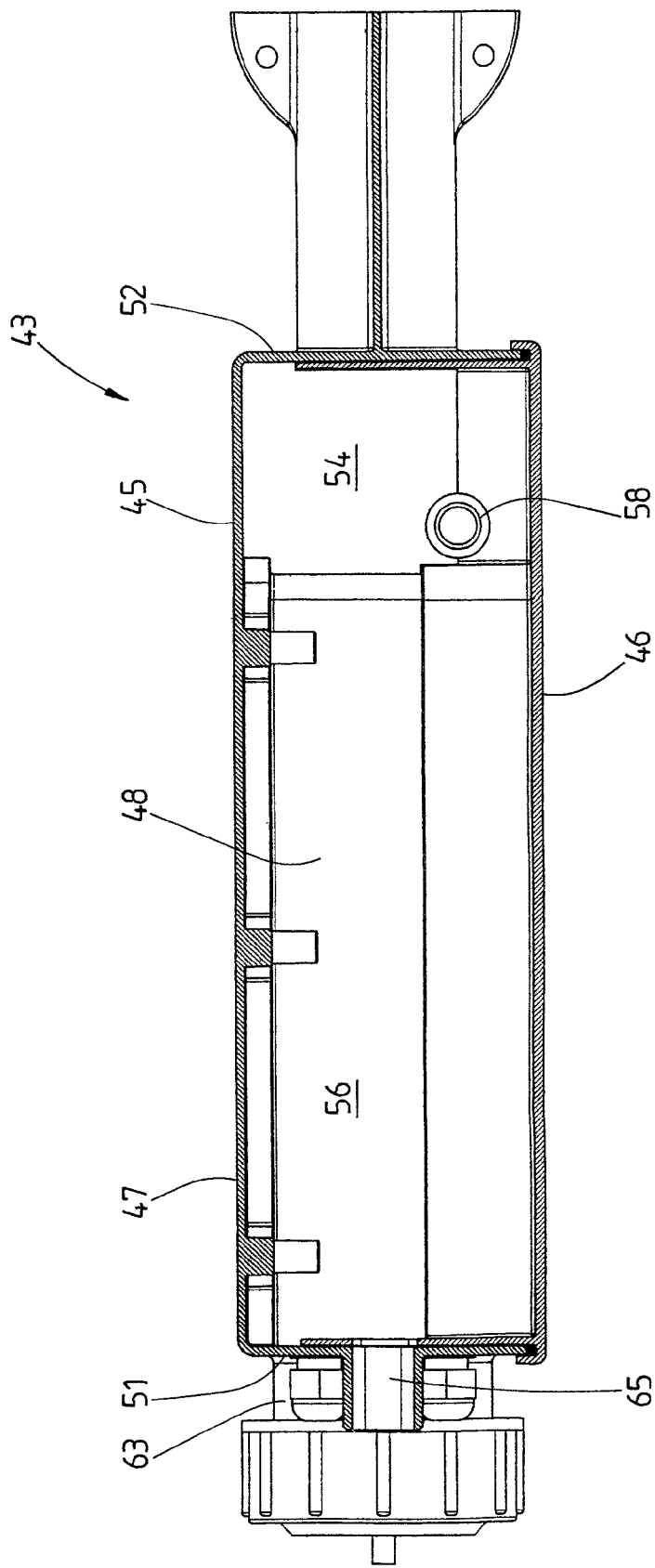
FIG. 5 is a longitudinal section V-V through the technical unit.
Figure 6:
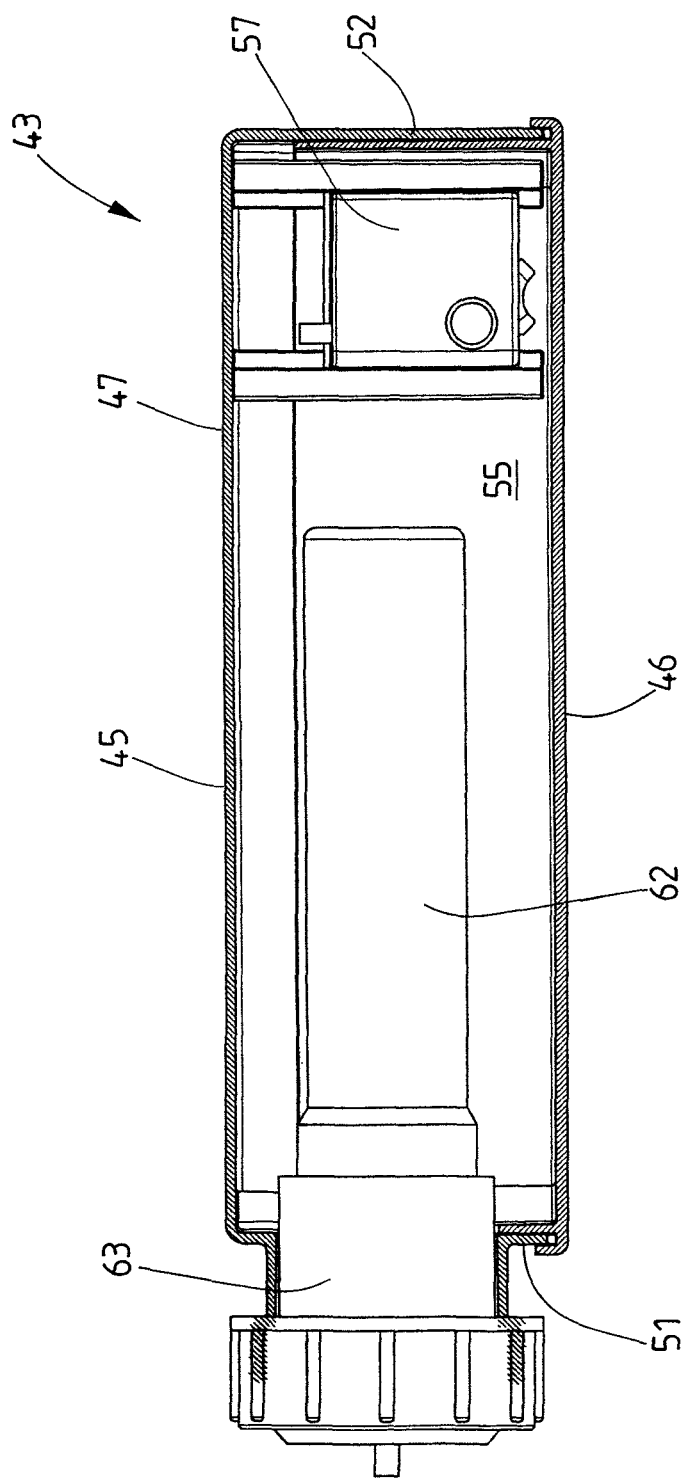
FIG. 6 is a longitudinal section VI-VI through the technical unit.

The pipe strings 23, 24, the webs 25, 26 and the edge profile 28 are connected to one another as a single piece, thus keeping the water circulation line 22 free of seams in which impurities, in particular bird droppings, might lodge (FIG. 5). This also makes it easy to clean the entire water circulation line 22.

Figure 9:
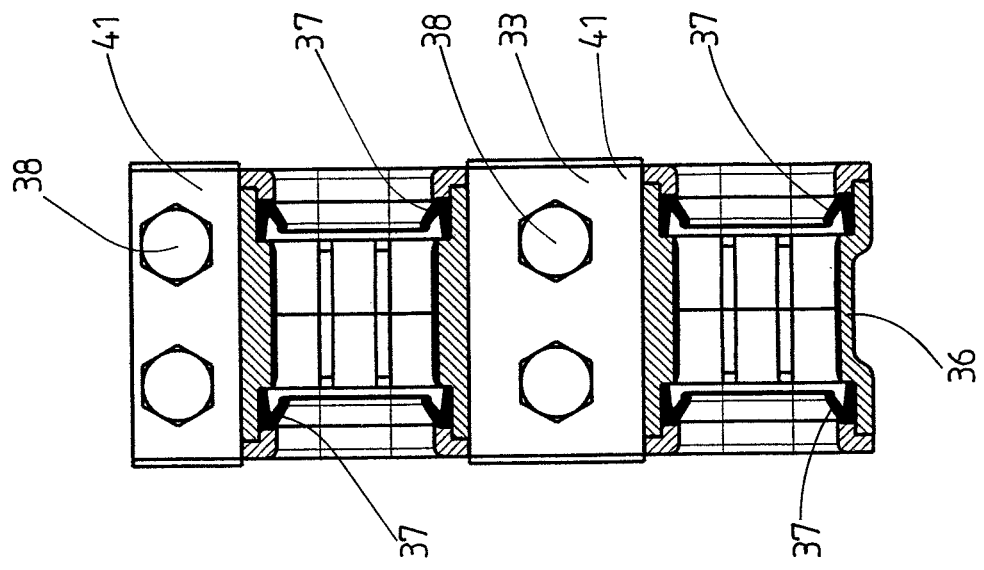
FIG. 9 is a vertical cut through a connector without the line sections.
Figure 8:
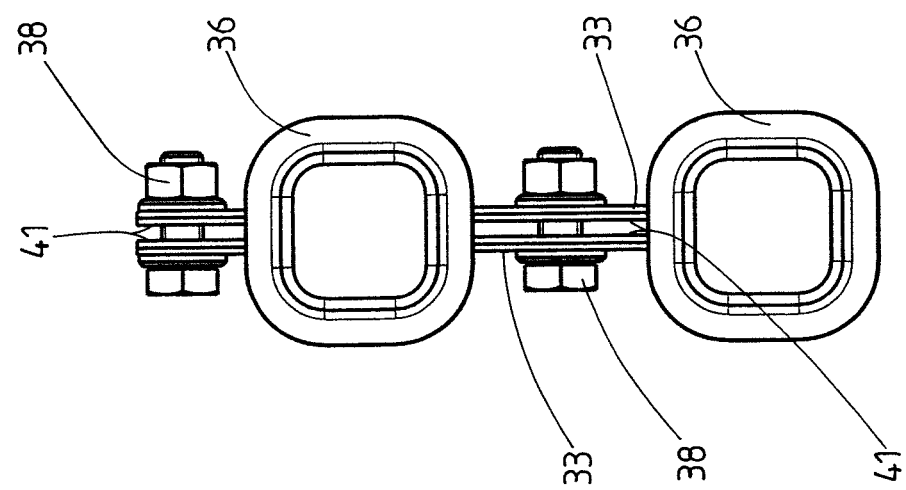
FIG. 8 is a view of a connector for two water line sections.
Figure 10:
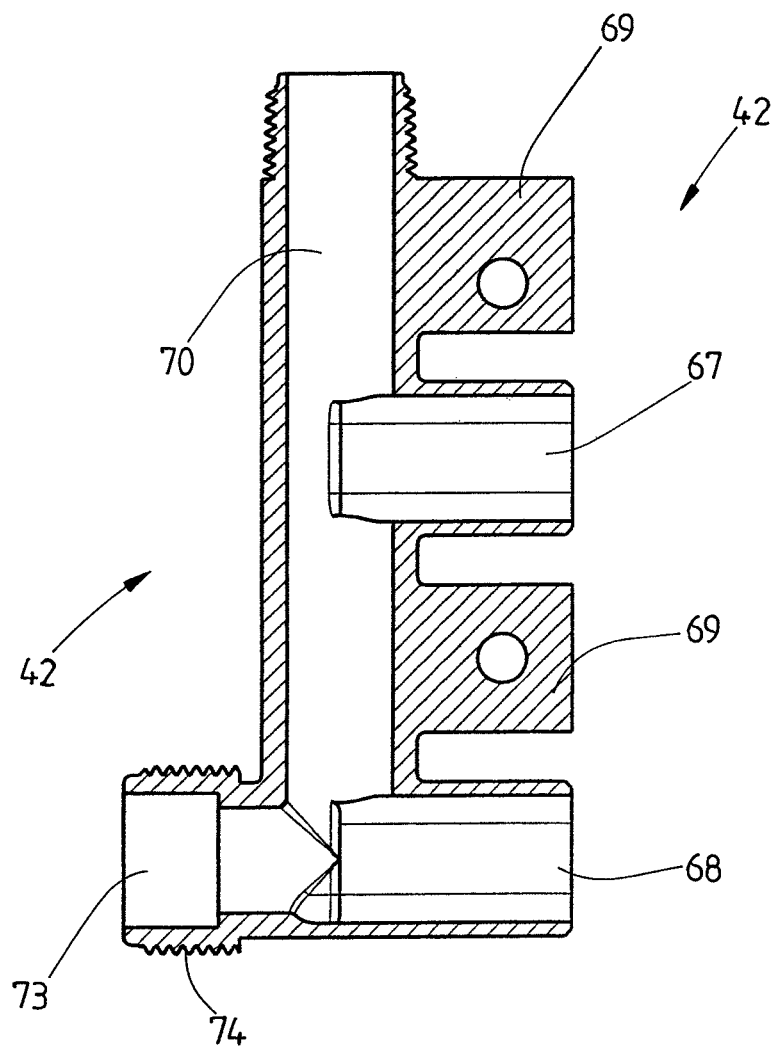
FIG. 10 is a central longitudinal section through a pipe string connector.

The water circulation line 22 is composed of identical line sections 31 preferably of the same length. A plurality of line sections 31 lying axially one behind the other form the entire water circulation line 22 of the line drinker. Depending on the length of the line drinker, the number of identical, in particular equally long line sections 31 arranged one behind the other varies. FIG. 1 shows only two line sections 31. But the invention is not limited to this number. The line drinker can be composed of any number of line sections 31. In general, it has more than two line sections 31. But in the case of relatively short line drinkers, it is also conceivable that they consist of only a single line section 31. The line sections 31 are combined by linking their facing ends at a connector 32. Provided for this purpose at each connector 32 are two detachable cheeks 33. The cheeks 33 are of identical configuration and are set against the water circulation line 22 from opposite sides thereof as a mirror image in terms of their relative positioning, specifically overlapping the adjacent end regions of the line sections 31 to be connected. The two cheeks 33 enclose adjacent end regions of the pipe string sections 34 and 35 used to form the pipe strings 23 and 24 of successive line sections 31. In order to achieve a watertight connection of the pipe string sections 34 and 35 of adjacent line sections 31, the assembled cheeks 33 form a sleeve 36 around the respective pipe string 23 and 24. The sleeves 36 for each pipe string 23 and 24 are provided with two spaced-apart seals 37. The adjacent end regions of the pipe string section 34 as well as of the pipe string section 35 to be connected to each other are thereby sealed by a respective seal 37 to prevent the escape of water at the connector 32 (FIG. 9). A plurality of bolts 38 (FIG. 8), which pass through the corresponding bore holes in the web sections 39 and 40 of the line sections 41 forming the webs 25 and 26, are tightened to press together the opposing cheeks 33 against the end regions of the web sections 39 and 40 until the bearing surfaces 41 of the cheeks 33 lie against the walls of the web sections 39 and 40. As a result, the seals 37 are pressed circumferentially from the outside against the end regions of the pipe string sections 34 and 35 and elastically preloaded to generate an effective sealing action.

The pipe strings 23 and 24 are connected at opposite ends of the animal drinker so that the water in the pipe strings 23, 24 can circulate. Located at the back end (i.e. the right-hand end as shown in the drawing of FIG. 1) of the water circulation line 22 is a pipe string connector 42, which can also serve as an venting valve and for flushing the water circulation line 22. At the opposite front end (the left-hand end in FIG. 1), the pipe strings 23 and 24 of the water circulation line 22 are connected by a technical unit 43 to conduct water. In the shown exemplary embodiment a pressure regulator 44 is arranged upstream of the technical unit 43 in terms of the direction of water flow. Of known design, the pressure regulator 44 reduces the pressure employed to provide the water from the water supply to a lower pressure level for operating the drinking valves. The tap water flows under lower pressure from the pressure regulator 44 through a inlet connection and into the technical unit 43.

Figure 3:
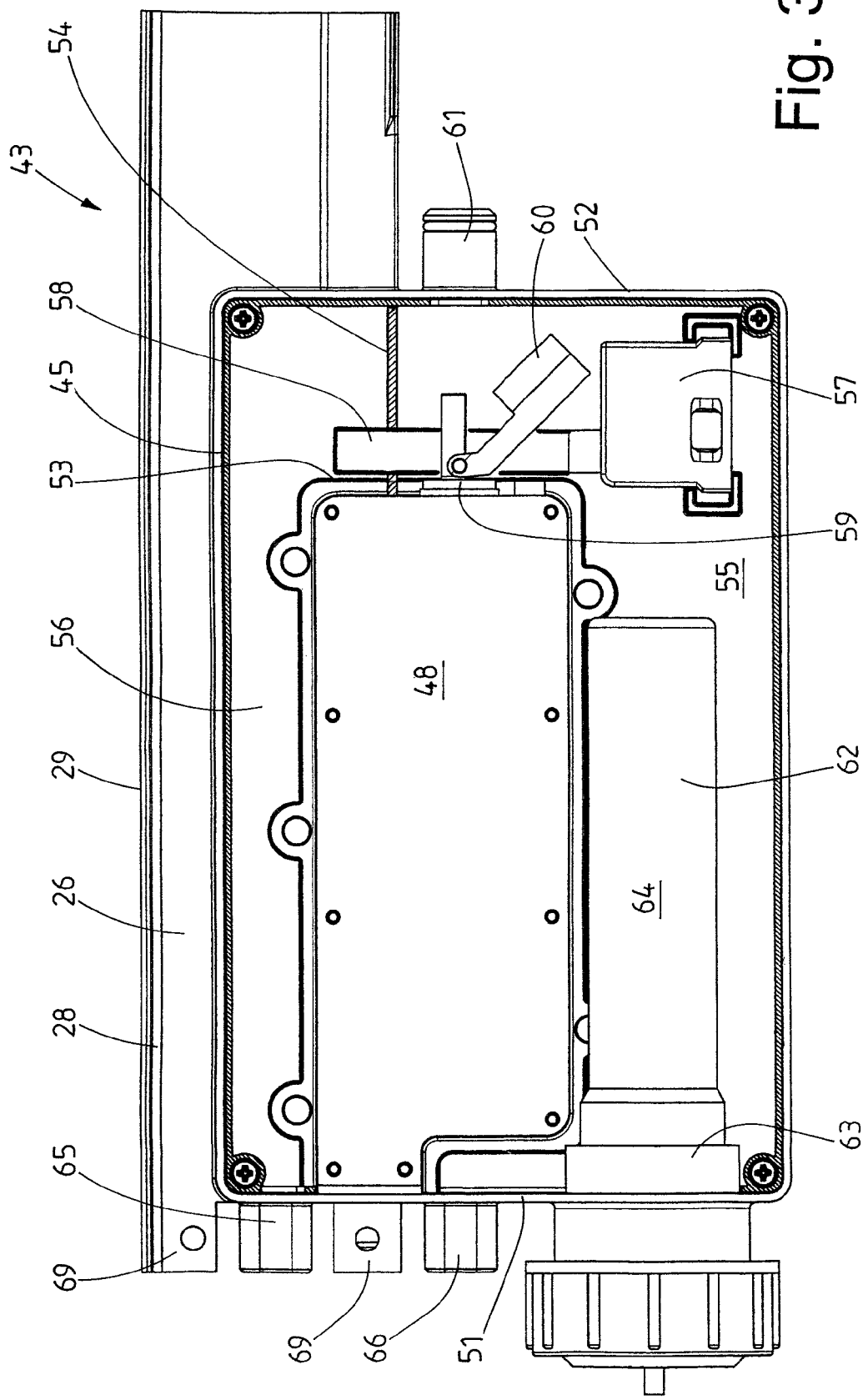
FIG. 3 is a vertical central longitudinal section through the technical unit of FIG. 2.
Figure 4:
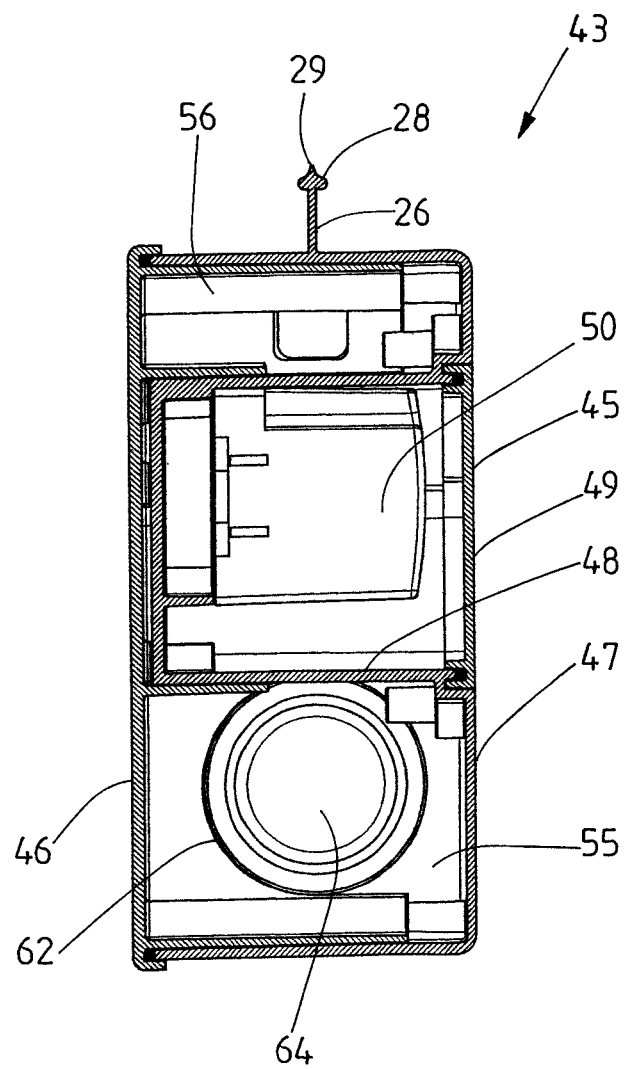
FIG. 4 is a cross section IV-IV through the technical unit.

The technical unit 43 has a watertight housing 45 in which the components essential for operating the animal drinker are located. The watertight housing 45 is formed from two half shells 46 and 47, which are bolted together and made tight with seals. Formed in the half shell 47 is a small inner housing 48 which extends across the entire width of the housing 45 and which is open at the outer side of the half shell 47. This open side of the inner housing 48 is sealed by a cover 49 to be liquid-tight, with the cover being flush with the outer wall of the half shell 47. The electric connections and the control system 50 of the animal drinker are accommodated in the inner housing 48 (FIG. 4). The inner housing 48 adjoins a vertical end wall 51 of the housing directed toward the water circulation line 22 but ends at a distance from the opposite end wall 52 of the housing 45 directed toward the pressure regulator 44. The inlet connection 61 is located in the housing end wall 52. A horizontal divider 54 is located inside the housing 45 between an end wall 53 of the inner housing 48, which is spaced apart from the housing end wall 52, and the housing end wall 52 itself. The divider 54 and the inner housing 48 provides a watertight partitioning of the housing 45 interior into a lower reservoir 55 and an upper overflow channel 56 (FIG. 3). The reservoir 55 is substantially greater in volume than the overflow channel 56. In the shown exemplary embodiment the reservoir 55 is several times larger than the overflow channel 56, with the inner housing 48 and the divider 54 thus being arranged above the lower half of the housing 45.

Located in the reservoir 55 in the housing 45 is a pump 57, which operates on the principle of a submergible pump, for example. On its pressure side, the pump 57 is provided with a vertical tube 58, which runs in watertight fashion through the divider 54 into the overflow channel 56. The pump 57 conveys water through this tube 58 from the reservoir 55 into the overflow channel 56 (FIG. 3). Also located in the reservoir 55 is a float switch 59, which in the shown exemplary embodiment is arranged above the pump 57. The float switch 59 has a float 60, which can pivot about a horizontal axis of rotation and which turns off the pump 57 whenever the water level in the reservoir 55 drops below a certain minimum level in order to keep the pump 57 from running dry.

The shown animal drinker has a treatment device for the water circulating in the animal drinker. In particular, this treatment device involves a UV lamp 62 which emits ultraviolet light. The UV lamp 62 is disposed in the reservoir 55 in the housing 45 (FIG. 3). The UV lamp 62 is screwed tightly and in watertight fashion into a socket 63 in the housing end wall 51 such that it can be inserted as a whole into the housing 45 from the outside. As a result, a treatment chamber 64 of the UV lamp 62 is located completely within the reservoir 55.

The animal drinker can have one or more further treatment devices for the circulating water. This can be a metering device for the additive dosing of supplements (preferably liquid supplements) into the water. This device can be a medicament dosage device, for example. Furthermore, a device for cooling and/or heating the water can be provided. Preferably, these additional treatment devices can also be disposed in the region of the technical unit 43 in order to cool and/or heat the water in the reservoir 55 and, if appropriate, for the additive dosage of medicaments, for example, to the water in the region of the reservoir 55 or also in the overflow channel 56.

Arranged in the end wall 51 of the housing 45 is a outlet connection 65 connected to the overflow channel 56. Water flows from the overflow channel 56 through the outlet connection 65 into the upper pipe string 23 of the water circulation line 22. Furthermore, the end wall 51 of the housing 45 is assigned an inlet connection 66 which leads into the reservoir 55. Water flows through the inlet connection 66 to return from the lower pipe string 24 of the water circulation line 22 back into the reservoir 55.

The pipe string connector 42 at the rear end of the water circulation line 22 opposite the technical unit 43 has an inlet connection 67, which is connected in a watertight manner to the end of the upper pipe string 23, and, below the latter, an outlet connection 68 connected in a watertight manner to the lower pipe string 24. The connection of the rear ends of the pipe strings 23 and 24 to the inlet connection 67 and the outlet connection 68 of the pipe string connector 42 is also detachable due to the cheeks 33 located on the connectors 32 of the line sections 31. Water coming from the pipe string 23 is diverted in the pipe string connector 42 and directed to the pipe string 24, in which the water flows back to the reservoir 55 in the housing 45 of the technical unit 43. The pipe string connector 42 has two brackets 69 on opposite sides of the inlet connection 67 with which the pipe string connector 42 can be bolted on the webs 25 and 26 of the water circulation line 22.

The pipe string connector 42 shown here is also employed to vent the water circulation line 22 and to flush the same whenever the animal drinker is to be cleaned. For this purpose an overflow channel 70, open at the top, in the pipe string connector 42 is extended upwards by means of a venting pipe 71 (FIG. 1). The normally open upper end of the venting pipe 71 can be closed by a closure 72 or a valve for flushing the animal drinker. At the lower end of the overflow channel 70 the pipe string connector 42 has a flushing connection 73 located opposite the outlet connection 68. The flushing connection 73 can be closed to be watertight during the operation of the animal drinker.

The operating principle of the animal drinker described above is explained in the following:

During operation of the animal drinker the flushing connection 73 of the pipe string connector 42 is closed and the venting pipe 71 is open.

During operation of the animal drinker, the pump 57 in the housing 45 of the technical unit 43 is in operation. The pump 45 can be operated continually as well as only periodically. During operation of the pump 57, the water in the animal drinker is circulated on a permanent basis. The pump 57 pumps water out of the reservoir 55 into the overflow channel 56 in the housing 45. From the overflow channel 56 the water is conducted into the pipe string 23. The water flowing through the pipe string 23 is diverted at the rear end of the water circulation line 22 by the pipe string connecter 42 into the lower pipe string 24, where the water flows past the drinking valves 20 to return to the reservoir 55 in the housing 45 of the technical unit 43. As long as the pump 57 is in operation, the water in the water circulation line 22 is constantly in motion even when no water is being removed by the animals at the drinking valves 20. Thus, when the pump 57 is in operation, the water continually flows through the animal drinker according to the invention in a closed circuit. In case there is not enough water in the reservoir 55, thus posing the risk of the pump 57 running dry, the pump 57 is turned off by the float switch 59 until there is again enough water in the reservoir 55.

The amount of circulated water decreases with time by the amount of water removed by the animals at the drinking valves 20. This causes the water level in the reservoir 55 to drop. Water is then fed by the pressure regulator 44 to the reservoir 55 until the reservoir 55 is again filled with a sufficient supply of water. The pressure regulator 44 thus ensures that the water level in the reservoir 55 is kept within a range which prevents the pump 57 from running dry.

As water circulates, a constant exchange of water takes place in the reservoir 55. The water in the reservoir 55 is irradiated with ultraviolet light by the UV lamp 62 of the treatment device. This process removes contaminants from the water, such as germs, bacteria and/or fungi. The water in the reservoir 55 is thus subjected to microbial treatment. Not only can the water can be purified by UV irradiation, but also a sterilization, disinfection and/or oxidation of the water can be conducted in the reservoir 55. Due to the circulation of water through the animal drinker, all of the water contained in the animal drinker is irradiated continuously. Continual treatment of the water can also be achieved by other means, such as cooling and heating the water or by the additive dosage of supplements to the water, in particular medicaments, nutrients or the like.

In order to flush the animal drinker, a water hose is connected to the flushing connection 73 of the pipe string connector 42 in order to drain off flushing water. The venting pipe 71 of the pipe string connector 42 is closed. Water is supplied by the pressure regulator 44 at undiminished line pressure to the reservoir 55 of the technical unit 43 at the beginning of the animal drinker. As the animal drinker is flushed, the water used for flushing then fills both pipe strings 23 and 24 under full line pressure while bypassing the pump 57. The flushing water thus flushes both pipe strings 23 and 24 at the same time and in common. During flushing operations, therefore, the water does not circulate through the pipe strings 23 and 24. The flushing water of both pipe strings 23 and 24 flows together in the pipe string connector 42 so that the flushing water from both pipe strings 23 and 24 can be directed out of the animal drinker via the flushing connection 73 of the pipe string connector 42.

LIST OF DESIGNATIONS 20 drinking valve
21 valve pin
22 water circulation line
23 pipe string
24 pipe string
25 web
26 web
27 center plane
28 edge profile
29 peaked edge
30 hanger
31 line section 32 connector
33 cheek
34 pipe string section
35 pipe string section
36 sleeve
37 seal
38 bolt
39 web section
40 web section
41 bearing surface
42 pipe string connector
43 technical unit
44 pressure regulator
45 housing
46 half shell
47 half shell
48 inner housing
49 cover
50 control unit
51 housing end wall
52 housing end wall
53 inner housing end wall
54 divider
55 reservoir
56 overflow channel
57 pump
58 tube
59 float switch
60 float
61 inlet connection
62 ultraviolet lamp
63 socket
64 treatment chamber
65 outlet connection
66 inlet connection
67 inlet connection
68 outlet connection
69 bracket
70 overflow channel
71 venting pipe
72 closure
73 flushing connection
74 external thread

What is claimed is:

1. An animal drinker comprising:
   a) at least one water supply line; and
   b) a plurality of drinking valves (20) that are assigned to the at least one water supply line,
   wherein the at least one water supply line is configured as a liner water circulation line (22) comprising two parallel linear pipe strings (23, 24) arranged one above the other,
   wherein the plurality of drinking valves (20) are assigned to a bottom pipe string (24) of the parallel pipe strings (23, 24) arranged one above the other, and
   wherein the two parallel pipe strings (23, 24) arranged one above the other are configured as being joined together.

2. The animal drinker according to claim 1, wherein the water circulation line (22) comprises a plurality of the parallel pipe strings (23, 24).

3. The animal drinker according to claim 1, wherein the parallel pipe strings (23, 24) are connected to one another to conduct liquid through the parallel pipe strings (23, 24).

4. The animal drinker according to claim 1, wherein ends of each of the parallel pipe strings (23, 24) are connected in a water-conducting manner to form the water circulation line (22).

5. The animal drinker according to claim 4, further comprising a venting means and a flushing connection (73), wherein the water-conducting connection of the parallel pipe strings (23, 24) is assigned the venting means and the flushing connection (73), which can be closed when necessary.

6. The animal drinker according to claim 1, wherein the water circulation line (22) is formed by a plurality of line sections (31) detachably connected to one another, the plurality of line sections (31) each comprising the two parallel pipe strings (23, 24) and the plurality of drinking valves (20).

7. The animal drinker according to claim 1, further comprising at least one pump (57) for circulating the water in the water circulation line (22).

8. The animal drinker according to claim 7, further comprising a reservoir, wherein the at least one pump (57) is supplied with water from the reservoir (55).

9. The animal drinker according to claim 8, further comprising at least one inlet connection (61) assigned to the reservoir (55) for supplying water from a water supply to the reservoir (55).

10. The animal drinker according to claim 9, further comprising a valve assigned to the at least one inlet connection (61), wherein the valve is actuated as a function of the water level in the reservoir (55).

11. The animal drinker according to claim 9, further comprising a pressure regulator (44) arranged upstream of the at least one inlet connection (61) to the reservoir (55).

12. The animal drinker according to claim 4, further comprising at least one pump (57) for circulating the water in the water circulation line (22) and a reservoir (55),
    wherein the at least one pump (57) is supplied with water from the reservoir (55), and
    wherein the at least one pump (57) and the reservoir (55) are assigned to the ends of the parallel pipe strings (23, 24) of the water circulation line (22) for the purpose of pumping water returning from one of the at parallel pipe strings (24) over to another of the parallel pipe strings (23).

* * * * *